(12) United States Patent
Antorcha

(10) Patent No.: US 7,537,284 B1
(45) Date of Patent: May 26, 2009

(54) SEAT COVER FOR A CAR SAFETY SEAT

(76) Inventor: Adriana Rendon Antorcha, 7329 Monaco St., Atlanta, GA (US) 33143

( * ) Notice: Subject to any disclaimer, the term of this patent is extended or adjusted under 35 U.S.C. 154(b) by 0 days.

(21) Appl. No.: 12/006,636

(22) Filed: Jan. 4, 2008

(51) Int. Cl.
  *A47C 31/11* (2006.01)
  *A47D 15/00* (2006.01)

(52) U.S. Cl. ................... 297/219.12; 297/482

(58) Field of Classification Search ............ 297/219.12, 297/482
  See application file for complete search history.

(56) References Cited

U.S. PATENT DOCUMENTS

| | | | |
|---|---|---|---|
| 5,979,981 A * | 11/1999 | Dunne et al. ........... | 297/219.12 |
| 6,688,701 B1 * | 2/2004 | Weaver .................... | 297/482 X |
| 6,722,733 B2 * | 4/2004 | Schmidt et al. ......... | 297/482 X |
| 6,955,403 B1 * | 10/2005 | Weaver .................... | 297/482 X |
| 7,222,917 B2 * | 5/2007 | Ward ................... | 297/219.12 X |
| 7,341,011 B2 * | 3/2008 | Pines et al. .......... | 297/219.12 X |
| 7,410,213 B1 * | 8/2008 | Ferrari-Cicero et al. | 297/219.12 |
| 2006/0006710 A1 * | 1/2006 | Sallus ................... | 297/219.12 |
| 2007/0085392 A1 * | 4/2007 | Friedland et al. ....... | 297/219.12 |
| 2008/0001451 A1 * | 1/2008 | Olson .................... | 297/219.12 |
| 2008/0073954 A1 * | 3/2008 | Paulson ................. | 297/219.12 |
| 2008/0079297 A1 * | 4/2008 | Braxton Perry ........ | 297/219.12 |
| 2008/0277981 A1 * | 11/2008 | Sizemore ............... | 297/219.12 |

* cited by examiner

*Primary Examiner*—Rodney B White
(74) *Attorney, Agent, or Firm*—Christos Kyriakou; Sven W. Hanson

(57) ABSTRACT

A seat cover of a child's car safety seat is described that is easily removed and replaced so that cover can be laundered or otherwise cleaned and replaced more frequently to provide a cleaner and healthier environment for a child.

11 Claims, 3 Drawing Sheets

SEAT COVER FOR A CAR SAFETY SEAT

BACKGROUND OF THE INVENTION

The present invention relates to removable seat covers that can be used to cover car safety seats of the type that are designed to secure and protect a baby, an infant, a toddler or a small child in an automobile, especially in the event of an accident. Car safety seats commonly include a molded plastic shell and a releasable safety harness that is anchored to the shell at least three points. Such car safety seats typically include a safety harness, for example a five-point harness or a three-point harness, that includes at least a pair of shoulder straps, each anchored in the backrest of the seat, and a buckle assembly anchored to the seat bottom and adapted for releasable coupling to the shoulder straps. A soft, padded cover is typically also provided and overlies the occupant-facing surfaces of the seat shell. The seat covers that come with car safety seats are not easily removed, laundered and replaced. Furthermore, padded seat covers are more difficult to launder and dry.

Babies, infants, toddlers and children (hereinafter, generally referred to as child or children for simplicity) frequently spill or soil while restrained in car safety seats. For example, children spill food and/or drinks, vomit or spit up and sometimes defecate or urinate on themselves and the car safety seat. Cleaning up after an infant can be difficult and messy. Historically, if the car safety seat material on which the child is restrained gets wet or dirty because of soiling, someone has to remove the entire car safety seat from the car and take the car safety seat apart in order to remove the car safety seat material to launder the car safety seat. This process can take several minutes and one is left without a functional car safety seat until the car safety seat material is washed, dried, and put back on the car safety seat, and the car safety seat is then put back in the car.

Aftermarket car safety seat covers have been proposed. U.S. Pat. No. 6,926,359 to Runk describes a pad sized and contoured to substantially conform to the front surface of a car safety seat.

U.S. Patent Publication no. 20070085391 to Pines et al. describes a car safety seat cover that includes a particular three-layer fabric assembly that is alleged to restrict the passage of liquids and particles.

However, there is still a need for an improved car safety seat cover that is easily removed and laundered. More particularly, there is a need for a car safety seat cover that is easy to remove, launder and replace so that the cover can be changed more easily and, thus, more frequently because car safety seat covers are frequently soiled by food and drink, vomit or spit up from acid reflux or motion sickness, feces or urine from leaking diapers or during the potty training among many other insults.

BRIEF SUMMARY OF THE INVENTION

The present invention provides a cover for a car safety seat that includes a seat bottom and including at least a pair of shoulder straps and a crotch belt and a buckle assembly for releasably coupling to the shoulder straps where the cover includes at least one panel, the at least one panel including a crotch opening though which a crotch belt and a buckle assembly is designed to pass and a tubular extension having a first end attached around the crotch opening and a second end that is open and through which the buckle assembly of the crotch belt and buckle assembly is designed to pass. In certain desirable embodiments, the second end of the tubular extension further includes a means for gathering the second end of the tubular extension around a crotch belt. The means for gathering the second end of the tubular extension around a crotch belt can be or include an elastic or elasticized portion that is designed and adapted to gather around a crotch belt below a buckle assembly. In certain other desirable embodiments the first end of the tubular extension has a first end width $W_{FE}$ through which a crotch pad and a crotch belt and a buckle assembly are designed to pass and the second end of the tubular extension has a second end width $W_{SE}$ through which a buckle assembly is designed to pass assembly wherein the first end width $W_{FE}$ is greater than the second end width $W_{SE}$ and is particularly desirable for use with new car safety seats that include a crotch pad that is designed and adapted to be placed between a child and the crotch belt to provide a cushion between the child and the crotch belt. In other desirable embodiments, the first end of the tubular extension has a first end width $W_{FE}$ through which a crotch pad and a crotch belt and a buckle assembly is designed to pass and the second end of the tubular extension has a second end width $W_{SE}$ through which a buckle assembly of a crotch belt and buckle assembly is designed to pass assembly wherein the first end width $W_{FE}$ is greater than about twice the second end width $W_{SE}$. In certain desirable embodiments, the cover further includes a left lap belt extension that comprises an extension having a first end attached at a left lap belt opening and a second end that is open and through which a left lap belt is designed and adapted to pass and a right lap belt extension that comprises an extension having a first end attached at a right lap belt opening and a second end that is open and through which a right lap belt is designed and adapted to pass. The left lap belt extension may further include mating separable fastening elements designed and adapted to releasably close the left lap belt extension around a left lap belt and the right lap belt extension may further include mating separable fastening elements designed and adapted to releasably close the right lap belt extension around a right lap belt. The left lap belt extension may further include a means for gathering the open end of the lap belt extension a left lap belt and the right lap belt extension may further include means for gathering the open end of the right belt extension around a right lap belt. In certain embodiments, the first end of the crotch extension has a first end width through which the crotch pad and a crotch belt and a buckle assembly is designed to pass and the second end of the tubular extension has a second end width through which a buckle assembly of is designed to pass assembly wherein the first end width is greater than the second end width.

The present invention also provides a cover for a car safety seat that includes a back panel having an upper portion and a lower portion and a left side and a right side; a right side panel joined to a lower portion and an upper portion of the right side of the back panel; a left side panel joined to a lower portion and an upper portion of the left side of the back panel; a right, substantially vertical slit; a left, substantially vertical slit; a right substantially horizontal slit that extends to right vertical slit and that is designed and adapted to allow a right shoulder belt to pass through; a left substantially horizontal slits that extends to left vertical slit and that is designed and adapted to allow a left shoulder belt to pass through; and a perimeter band that encircles the outer edges of the back panel, left side panel and right side panel. In certain embodiments, the right, substantially vertical slit extends to an opening for a right lap belt, and the left, substantially vertical slit extends to an opening for a left lap belt. In still other embodiments, the cover also includes a right, angled slit that extends from the right, substantially vertical slit to an opening for a right lap belt, and a left, angled slit that extends from the left, substantially vertical slit to an opening for a left lap belt. In certain desirable embodiments, the cover includes a crotch opening that is located on the lower portion of back panel though which a crotch belt and buckle assembly is designed to pass and a tubular extension having one end attached to the lower portion of the back panel and around the crotch opening. In other embodiments, the cover includes an opening for a crotch belt and a tubular extension having a first end that is attached to the lower portion of the back panel and is disposed around the opening for a crotch belt and a second end that includes a means for gathering the tubular extension around a crotch belt. The means for gathering may be or include, for example a tie, a ribbon, a string, an elastic, an elastic portion or mating separable fasteners. In still other embodiments, the cover includes a tubular extension attached at one end to an opening in a lower portion of the back panel. A tubular extension may include, but does not necessarily include, a means for gathering the tubular extension around a belt. Examples of means for gathering the end of a tubular extension around a belt include, are not limited to, an elastic, an elastic portion, an elasticized portion, a tie, a ribbon, a pair of ribbons, a string, a pair of strings, a pair of separable mating fasteners and so forth.

The present invention also provides a cover for a car safety seat that includes an upper central panel having a left edge, a right edge, an upper edge and a lower edge; a lower central panel having a left edge, a right edge, an upper edge and a lower edge; a right side panel having an exterior edge and an interior edge wherein an upper portion of the interior edge is joined to the right side of the upper panel and a lower portion of the interior edge is joined to the right side of the lower panel; a left side panel having an exterior edge and an interior edge wherein an upper portion of the interior edge of the left side panel is joined to the left side of the upper panel and a lower portion of the interior edge is joined to the left side of the lower panel; an opening defined by the lower edge of the upper central panel, a middle portion of the interior edge of the right side panel, the upper edge of the lower central panel and a middle portion of the interior edge of the left side panel, wherein the opening is designed and adapted to allow a head support to pass through; and a head support cover. A perimeter band that encircles the exterior edges of the left side panel and the right side panel, the upper edge of the upper panel and the lower edge of the lower panel may also be included. Such an embodiment is particularly suitable for newer car safety seats that include an adjustable headrest such as Britax Boulevard® child seat. In certain embodiments, the head support cover further includes a downward extension. In certain other embodiments, the head support cover further includes a downward extension that has a right edge that comprises a mating separable fastening element that mates with a mating separate fastenable element provided on a middle portion of the interior edge of the right side panel, and a left edge that comprises a mating separable fastening element that mates with a mating separate fastenable element provided on a middle portion of the interior edge of the left side panel. In still other embodiments, the downward extension of head support cover further includes a left slit that extends to the left edge of the downward extension and that is designed and adapted to allow a left shoulder belt to pass through and a right slit that extends to the right edge of the downward extension and that is designed and adapted to allow a right shoulder belt to pass through.

In certain desirable embodiments, the cover is adjustable so that it can fit car safety seats of various sizes, styles and manufactures. For example, the car safety seat cover can be designed to fit a car safety seat that uses a three-point harness or a five-point harness, with fixed or movable shoulder slots, or a car safety seat with a movable headrest for additional protection during side impacts.

Desirably, covers of the present invention provide easily removable and cleanable covers that do not alter with the original flow of the security belts and safety of a car safety seat. In certain embodiments, the covers have antimicrobial and/or antibacterial properties.

BRIEF DESCRIPTION OF THE DRAWINGS

A full and enabling disclosure of the present invention, including the best mode thereof is set forth in the detailed description which makes reference to the appended figures in which.

DETAILED DESCRIPTION OF THE INVENTION

Figure 1:
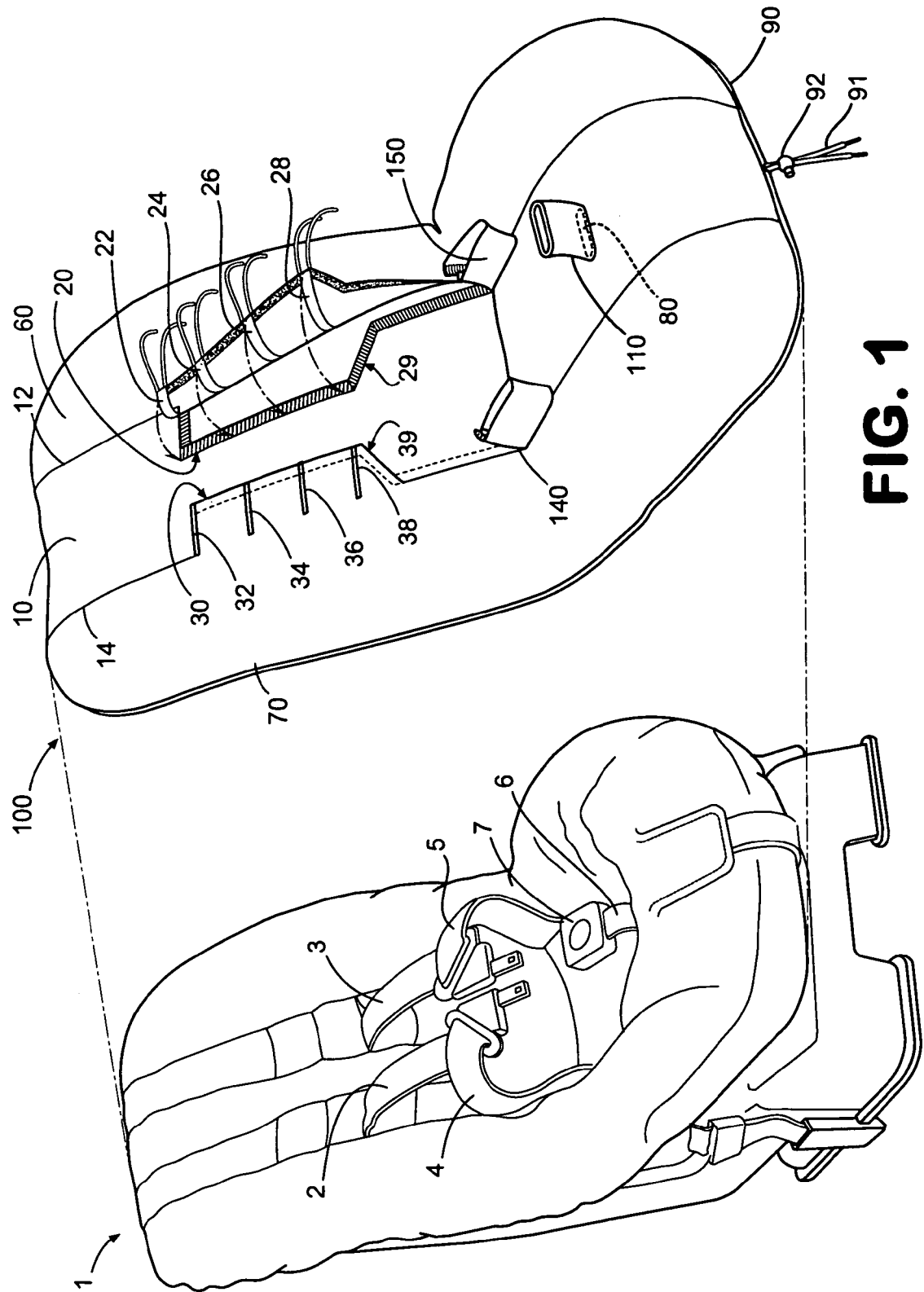
FIG. 1 is an exploded, perspective view of an exemplary car seat cover of the present invention and a car safety seat on which the car seat cover fits.

The drawings and detailed description provide a full and detailed written description of the invention, and of the manner and process of making and using it, so as to enable one skilled in the pertinent art to make and use it, as well as the best mode of carrying out the invention. The detailed description uses numerical and letter designations to refer to features in the drawings. Like or similar designations in the drawings and description have been used to refer to like or similar parts of the invention. The examples set forth in the drawings and detailed description are provided by way of explanation of the invention and are not meant as limitations of the invention. The present invention thus includes any modifications and variations of the following examples as come within the scope of the appended claims and their equivalents.

Referring to FIG. 1, a first exemplary embodiment of a seat cover 100 of the present invention is illustrated. The exemplary seat cover 100 is designed and adapted to fit over a child safety seat 1. Seat cover 100 includes a back panel 10 that is desirably designed, sized and adapted to substantially conform to the front surface of the child safety seat and desirably covers the back portion and the bottom portion of the seat 1. The seat cover 100 also includes and a right side panel 60 and a left side panel 70. In the embodiment illustrated in FIGS. 1 and 2, cover 100 is formed from three major pieces of fabric, a back panel 10 that is joined, for example by sewing, to a right side panel 60 and to a left side panel 70 to form the cover 100. Desirably, side panels 60 and 70 are each sized and contoured to substantially conform to the left side and right side, also sometimes referred to as left and right bolster portions, respectively, of the underlying car safety seat. Right side panel 60 is joined to the right edge of back panel 10 along a right seam 12. A right, substantially vertical slit 20 is provided in back panel 10 inside of right seam 12 as illustrated or, alternatively, may be located between right side panel 60 and back panel 10. Likewise, left side panel 70 is joined to the left edge of back panel 10 along a left seam 14. A left, substantially vertical slit 30 is provided in back panel 10 inside of left seam 14 or may be located between left side panel 70 and back panel 10. In certain embodiments, seams 12 and 14 are located so that the seams 12 and 14 occur at the transitions between the resting surface and the side bolster portions of the underlying, plastic car safety seat shell.

Vertical slits 20 and 30 are designed and adapted to allow shoulder straps 2 and 3 and, optionally, lap straps 4 and 5 from an underlying child safety seat to pass through. Thus, vertical slits 20 and 30 may also be optionally designed and adapted to allow lap straps 4 and 5 from a 5-point harness of the underlying child safety seat to pass through. Back panel 10 also includes a plurality of spaced apart, substantially horizontal slits 22, 24, 26 and 28 on the right side that connect to right vertical slit 20 and a plurality of spaced apart, substantially horizontal slits 32, 34, 36 and 38 on the left side that connect to left vertical slit 30. Spaced apart, substantially horizontal slits 22, 24, 26 and 28 may extend either outwardly from right vertical slit 20 as shown or inwardly toward right vertical slit 20. Likewise, spaced apart, substantially horizontal slits 32, 34, 36 and 38 may extend either outwardly or inwardly toward left vertical slit 30. In certain desirable embodiments, the shorter spaced apart substantially horizontal slits in the back panel extend inwardly to one of the longer, substantially vertical slits. In certain embodiments, the cover 100 includes one, two, three, four or five pairs of shorter spaced apart substantially horizontal slits wherein one of each of the pair connects to one of the two longer substantially vertical slits 20 and 30. Substantially horizontal slits 22, 24, 26, 28, 32, 34, 36 and 38 are designed and adapted to allow adjustable shoulder straps from a child safety seat to pass through and are particularly suited to models of car safety seats that have adjustable shoulder straps, for example a Britax Marathon Convertible Car Seat® as manufactured by Britax International Ltd. or a Triumph Advance™ Deluxe Convertible Car Seat as manufactured by Evenflo Company, Inc. Desirably, the slits, both the vertical slits 20 and 30, and the shorter substantially horizontal slits 22, 24, 26, 28, 32, 34, 36 and 38 are positioned and oriented so that belts from the car safety seat are easily inserted and removed without twisting the belts and, more preferably, with minimal manipulation and/or repositioning of the belts that are part of a safety seat. Thus, in certain embodiments adjacent substantially horizontal slits may be spaced from about one inch to about two inches apart. In certain embodiments, horizontal slits are not required because some child safety seats, for example an Evenflo Triumph® Advance Convertible Car Seat that has Infinite Slide™ adjustable shoulder harnesses, do not require covers with horizontal slits. Car seat covers designed and adapted to fit child safety seats such as an Evenflo Triumph® Advance Convertible Car Seat may require only left and right substantially vertical slits, such as slits 20 and 30. Vertical slits 20 and 30 may extend to lap belt opening via additional slit extensions 29 and 39 as to allow combination shoulder and lap belts to pass there through. Generally, a slit extension extends from a vertical slit to an opening provided for a lap belt.

Figure 2:
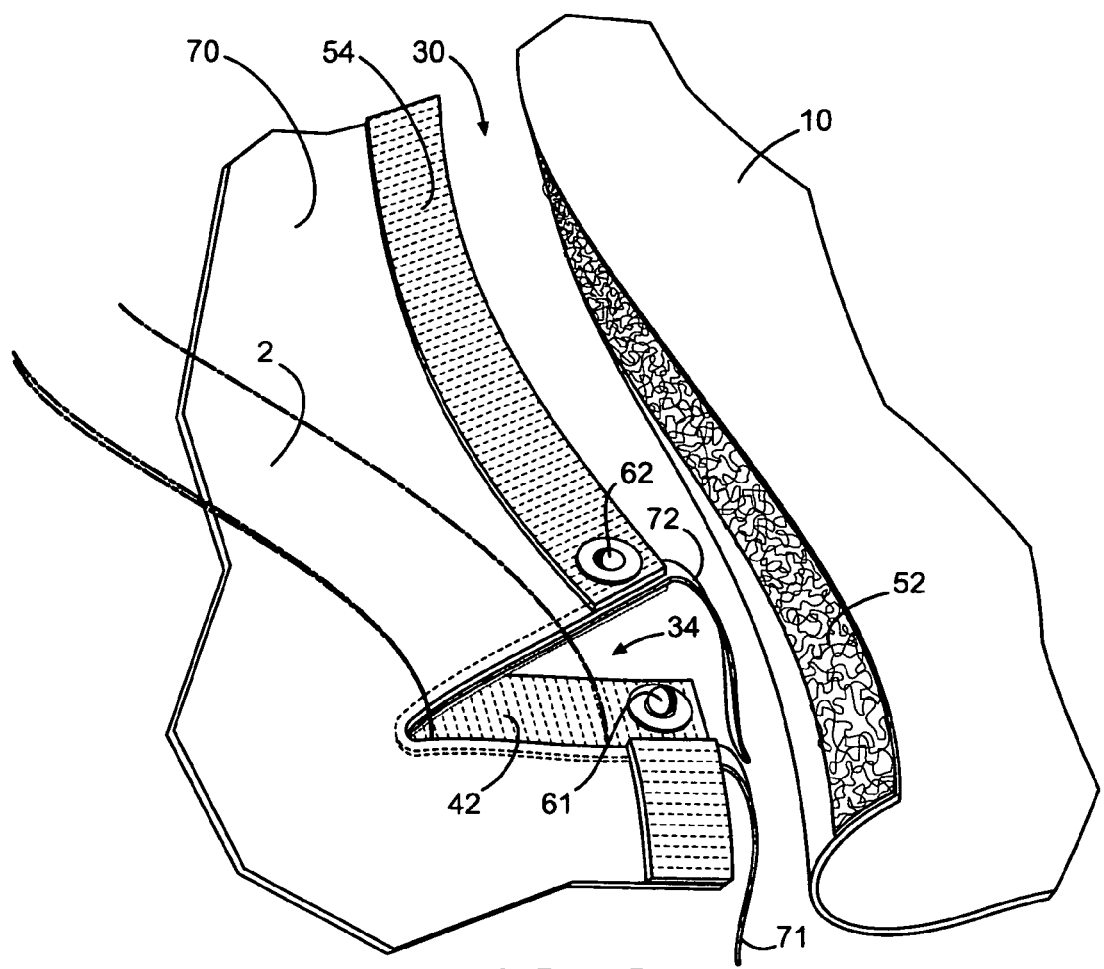
FIG. 2 is an enlarged, perspective view of a vertical slit and a horizontal slit in of the car seat cover illustrated in FIG. 1.

In certain desirable embodiments, cover 100 further includes mating separable fastening elements, for example hook and loop type fasteners such as VELCRO fasteners, on opposing sides of vertical slit 20 and on opposing sides of vertical slit 30 so that vertical slits 20 and 30 can be sealed or partially sealed after the cover has been fitted on to a car safety seat and after the appropriate harness straps, for example shoulder and/or lap straps, have been inserted through vertical slits 20 and 30. In the illustrated embodiment, the hook portion of a hook and loop fastener is provided along one side of vertical slits 20 and 30 and the loop portion of a hook and loop fastener is provided along the other side of the length of vertical slits 20 and 30, for example as illustrated in FIGS. 1 and 2. Other examples of mating separable fasteners include, but are not limited to, zippers, such as conventional zippers, plastic zippers such as ZIPLOC® fasteners and MAXI-GRIP™ barrier closures manufactured by ITW Maxigrip of Somerset, N.J., snaps and so forth. The fasteners can be used to secure the position of the cover on a safety seat and/or to aid in the positioning of the shoulder and/or lap belts of a safety seat. In addition, the fasteners may reduce and/or minimize leaking or fluids and penetration or crumbs, debris or other insults to the safety seat below.

Referring to FIG. 2, an enlarged, perspective view of vertical slit 30 and horizontal slit 34 is provided. In this exemplary embodiment, a loop portion 52 of a mating separable fastener, for example a hook and loop fastener, is provided along a portion of the left edge of back panel 10 and a hook portion 54 of a hook and loop fastener is provided along a portion of the interior edge of left side panel 70. Additional mating separable fasteners may also be optionally provided along the opposing edges of each the substantially horizontal slits 22, 24, 26, 28, 32, 34, 36 and 38. For example, a hook portion 42 of a hook and loop fastener can be provided along one edge of slit 34 as illustrated in FIG. 2 and a loop portion (not shown) of a hook and loop fastener can be provided along the other, opposing edge of slit 34. In still other embodiments, the cover 100 may include additional or other mating separable fastening elements, for example plastic or metal snaps, at a point just above or just below where a horizontal slit intersects a vertical slit to provide additional closure and/or strength. A snap is illustrated in FIG. 2 which shows a male portion of a snap 61 located on side panel 70 on one side of horizontal slit 34 and a female portion of a snap 62 located on side panel 70 on the other side of the horizontal slit 34. One or both of the snaps or hook and loop fasteners can be provide on extensions from the panels to improve fit and/or to make the cover easier to install and remove form a child safety seat. FIG. 2 also illustrates an alternative to a snap, a pair of ties that could be for example a length of elastic, string or ribbon that can be provided on each side of a horizontal slit 34 so that the slit can be secured by tying the two opposing lengths of elastic, string or ribbon. FIG. 2 also illustrates a first length ribbon 71 located on side panel 70 on one side of horizontal slit 34 and a second length of ribbon 72 located on side panel 70 on the other side of the horizontal slit 34. The lengths of ribbon can be tied together after the cover is fitted to secure the position of a belt in a slit.

Cover 100 further includes a perimeter band 90 so that the cover can be fit over the front of a safety seat 1 and removably secured around the front or outer edges of a safety seat. The perimeter band may be an elastic band, a draw cord 91 with a toggle 92 as illustrated or any other type device, for example an elastic, that can be positioned about the perimeter of the cover 100 and used to hold and/or secure the cover in place over a child safety seat. In certain embodiments, the perimeter band is an elastic or an elastic draw cord. Desirably, the perimeter band provides the cover with the greater ability to fit most models of car safety seats and optionally strollers, swing seats, high chair seats, and infant carriers.

Figures 3, 3A:
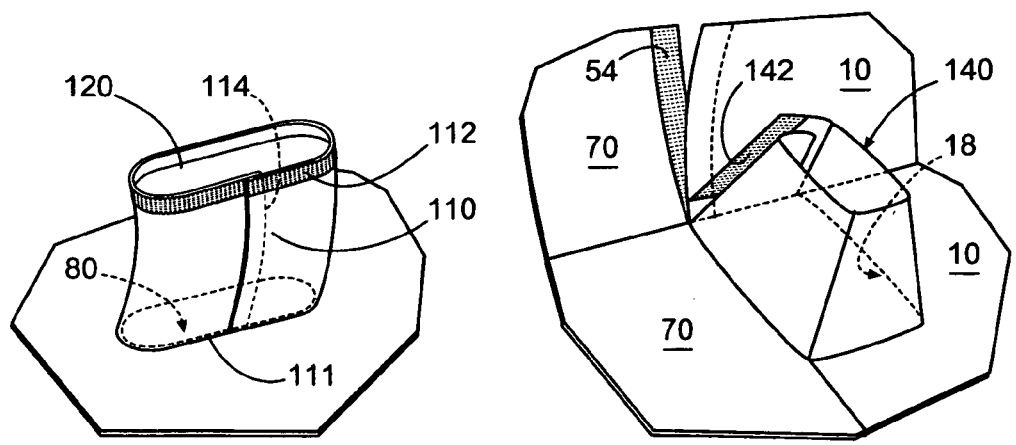
FIG. 3 is an enlarged, perspective view of an extension in an outward protruding orientation that can be included around an opening to provide additional resistance to water and/or particles traveling through or around the cover to the child safety seat.
FIG. 3A is an enlarged, perspective view of a lap belt extension that can be included around a lap belt opening to provide additional resistance to water and/or particles traveling through or around the cover to the child safety seat.
Figures 4, 5:
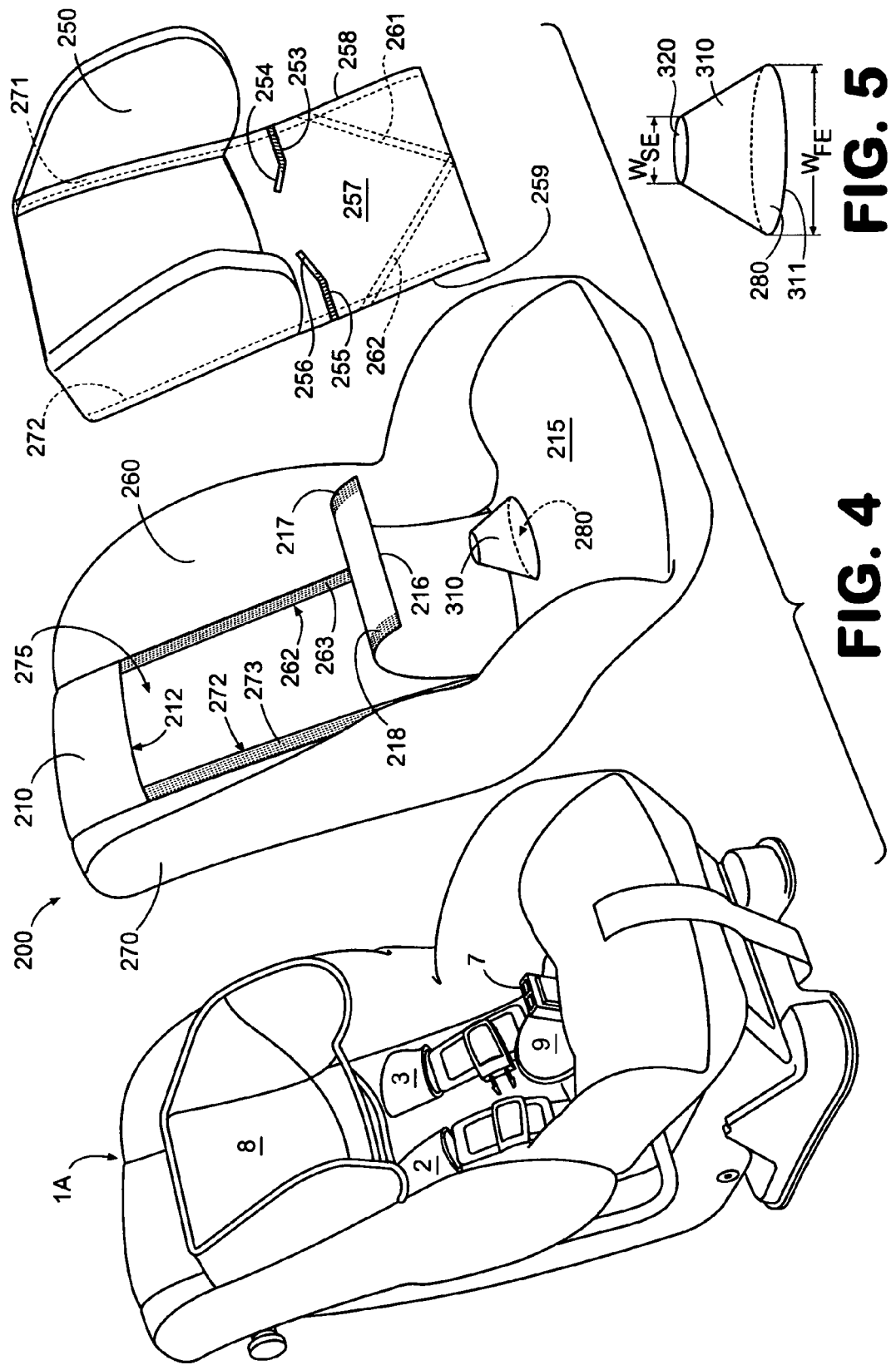
FIG. 4 is an exploded, perspective view of a second exemplary car seat cover of the present invention and a car safety seat for a child that included an adjustable headrest for additional side impact protection.
FIG. 5 is an enlarged, perspective view of an extension that can be included around an opening for a crotch pad and a crotch belt and buckle assembly.

Cover 100 also includes a crotch slit 80 that is located on the lower portion of back panel 10 though which a crotch belt 6 and a buckle assembly 7 are designed to pass through. In certain desirable embodiments, cover 100 includes at least one tubular extension 110 located around crotch slit 80 or another opening located in the lower portion of the back panel 10 of the cover 100 to provide additional resistance to water and/or particles traveling through or around the cover to the child safety seat. In the illustrated embodiment, tubular extension 110 is show in an outwardly protruding orientation may possibly extend inwardly. Tubular extension 110 is similar in design and appearance to a sleeve, for example a shirtsleeve, as illustrated in FIG. 3 and is attached at one end 111 to back panel 10 around an opening, for example, crotch slit 80 and has a second open end 120. Tubular extension 110 is attached at one end to back panel 10 around crotch slit 80. Tubular extension 110 has a second open end 120 through which a buckle assembly 7 of a crotch belt 6 and buckle assembly can pass. The first end 111 of tubular extension 110 can be the same width as the second open end as illustrated in FIG. 3 or may be wider than the second open end 120 of the tubular extension as illustrated in FIG. 5 to provide an extension that narrows from the crotch opening to the open end 120 and may have a shape similar to the shape of a volcano or a trapezoid. Tubular extension 110 may also further include a means for gathering an end of a tubular extension 110 around a belt such as an elastic 112 provided at the perimeter of open end 120 to gather the tubular extension 110 around a belt and provide additional resistance to water and/or particles, for example food crumbs, traveling through or around the cover 100 to the child safety seat and/or the original cover for the safety seat. Examples of means for gathering the tubular extension around a belt include, are not limited to, a gather, an elastic, an elastic portion, an elasticized portion, a tie, a ribbon, a pair of ribbons, a string, a pair of strings, a pair of separable mating fasteners and so forth.

In certain desirable embodiments, cover 100 also includes a left lap belt extension 140 that comprises an extension having a first end attached to one or more panels at a left lap belt opening and a second end that is open and through which a left lap belt 4 is designed and adapted to pass and a right lap belt extension 150 that comprises an extension having a first end attached to one or more panels, for example back panel 10 and right side panel 60, at a right lap belt opening and a second end that is open and through which a right lap belt 5 is designed and adapted to pass. In the illustrated embodiment, the lap belt extensions are connected to the back panel 10 and either one of the two side panels. The left lap belt extension may further include a vertical opening and mating separable fastening elements, for example a hook portion or a loop portion 140 as illustrated in FIG. 3A, one each side of the vertical opening to allow the left lap belt extension to be releasably closed around a left lap belt. Likewise, the right lap belt extension may further include mating separable fastening elements designed and adapted to releasably close the right lap belt extension around a right lap belt. The left lap belt extension may further include an elasticized portion that is designed and adapted to gather the open end of the extension around a left lap belt and the right lap belt extension may further include an elasticized portion that is designed and adapted to gather the open end of the extension around a right lap belt.

A second embodiment of a cover 200 of the present invention is illustrated in FIG. 4. The embodiment illustrated in FIG. 4 is particularly suited to models of car safety seats 1A that include an additional head support 8 to provide additional protection during side impact. An example of a car safety seat that includes an additional head support includes, but is not limited to, a Britax Boulevard® child seat manufactured by Britax International Ltd or a Primo Viaggio SIP Infant Car Seat as manufactured by Peg Perego of Italy. The Britax Boulevard® child seat not only includes an adjustable head support 8 but also includes a crotch pad 9 that is designed and adapted to fit around a crotch belt so that the crotch pad can be placed between a child and a crotch belt and buckle assembly 7 to provide a cushion between the child and the crotch belt and buckle assembly 7. Thus, in certain desirable embodiments, the present invention provides a cover 200 for a car safety seat 1A that is designed and adapted to fit a seat with an additional head support and example of which is illustrated in FIG. 4.

Referring to the exemplary embodiment illustrated in FIG. 4, cover 200 is formed from four panels: an upper central panel 210 having a left edge, a right edge, an upper edge and a lower edge 212; a lower central panel 215 having an right edge, a left edge, an upper edge 216 and a lower edge; a right side panel 260 having an exterior edge and an interior edge 262 wherein an upper portion of the interior edge of the right side panel is joined to the right side of the upper panel 210 and a lower portion of the interior edge of the right side panel is joined to the right side of the lower panel 215; a left side panel 270 having an exterior edge and an interior edge 272 wherein an upper portion of the interior edge of the left side panel is joined to the left side of the upper panel 210 and a lower portion of the interior edge of the left side panel is joined to the left side of the lower panel 215. Although lower central panel 215 is illustrated as a single panel that is folded at the transition from the generally horizontal lap section to the generally vertical lower back section, lower panel can be formed from two or more sections of fabric. Generally, the interior edges or portions of the interior edges 212, 262, 216, and 272 of the four panels 210, 260, 215 and 270 form and define an opening 275 that is defined by the lower edge 212 of the upper central panel 210, a middle portion of the interior edge 262 of the right side panel 260, the upper edge 216 of the lower central panel 215 and a middle portion of the interior edge 272 of the left side panel 270. The opening 275 is designed and adapted to allow a head support 8 to pass through. A perimeter band (not shown) can be included at the exterior edges of the left side panel 270 and the right side panel 260, the upper edge of the upper panel 210 and the lower edge of the lower panel 215.

A cover for head support 250 that is designed and adapted to cover an adjustable head support 8 is also provided. Such an embodiment is particularly suitable for newer car safety seats that include an adjustable headrest such as Britax Boulevard® child seat. In certain embodiments, the head support cover 250 further includes a downward extension 257. The head support cover 250 may also include a perimeter band (not shown) to facilitate fitting of the head support cover 250 on and around a head support 8. In certain other embodiments, the head support cover 250 may further include a downward extension 257 that has a right edge 258 that may also further include a mating separable fastening element 271 on the back side that mates with a mating separate fastenable element 263 that may be provided on the middle portion of the interior edge 262 of the right side panel 260, and a left edge 259 that may also further include a mating separable fastening element 272 on the back side that mates with a mating separate fastenable element 273 that may be provided on the middle portion of the interior edge 272 of the left side panel 270. The head support cover 250 may further include elastic straps 261 and 262 on the back side of downward extension 257 as illustrated or ties or fastenable elements or other means fitting the head support cover to a downward extension that may be included in a head support 8 to assist in fitting the head support cover to a head support 8.

In the illustrated embodiment, lower central panel 215 includes a mating separate fastenable element 217 along one edge of an upper portion of lower central panel that mates with a portion of a mating separate fastenable element 263 provided on edge 262 and a mating separate fastenable element 218 along the other edge of an upper portion of lower central panel that that mates with a portion of a mating separate fastenable element 273 provided on edge 272.

In still other embodiments, the downward extension 257 of head support cover 250 also includes a left-angled slit 256 that extends to a horizontal slit 255 that then extends to the left edge 259 of the downward extension 257. Slit 256 and slit 255 are designed and adapted to allow a left shoulder belt 2 to pass through. A right-angled slit 254 that extends to a horizontal slit 253 that then extends to the right edge 258 of the downward extension 257 is also provided. Slit 254 and slit 253 are designed and adapted to allow a right shoulder belt 3 to pass through. The downward extension 257 of head support cover 250 may also include VELCRO fasteners or other mating separate fastenable elements at slits 255 and 253 to further assist in fitting and/or securing the head support cover to a car seat and a head support that is included with the car seat. Slits 254 and 256 can be doglegged as shown or simply angled or horizontal and are desirably positioned to allow shoulder belts to pass through with minimal manipulation.

Cover 200 also includes a crotch opening 280 though which a crotch pad 9, crotch belt and a buckle assembly 7 is designed to pass. A tubular extension 310 having a first end 311 attached around the crotch opening 280 and a second end 320 that is open and through which the buckle assembly 7 of the crotch belt and buckle assembly is designed to pass. In certain desirable embodiments, the second end of the tubular extension further includes a means for gathering the open end of the tubular extension around a crotch belt. Again, the means for gathering the tubular extension around a crotch belt can be or include an elastic or elasticized portion that is designed and adapted to gather around a crotch belt below a buckle assembly. In certain other desirable embodiments, the first end 311 of the tubular extension 310 has a first end width $W_{FE}$ through which a crotch pad 9 and a crotch belt and a buckle assembly 7 are designed to pass and the second end 320 of the tubular extension 310 has a second end width $W_{SE}$ through which a buckle assembly 7 is designed to pass assembly wherein the first end width $W_{FE}$ is greater than the second end width $W_{SE}$ and is particularly desirable for use with new car safety seats that include a crotch pad that is designed and adapted to be placed between a child and the crotch belt to provide a cushion between the child and the crotch belt. In other desirable embodiments, the first end of the tubular extension has a first end width $W_{FE}$ through which a crotch pad and a crotch belt and a buckle assembly is designed to pass and the second end of the tubular extension has a second end width $W_{SE}$ through which a buckle assembly of a crotch belt and buckle assembly is designed to pass assembly wherein the first end width $W_{FE}$ is greater than about one and a half times the second end width $W_{SE}$ and in certain embodiments greater than about twice the second end width $W_{SE}$. In certain other embodiments, tubular extension 310 includes a vertical slip or opening 114 that can be used to facilitate opening of the tubular extension 310 to enable a lap belt and buckle assembly to fit through the tubular extension 310.

Generally, the cover can and the panels can be formed from any type of fabric, for example a polyester fabric or a cotton fabric. In certain desirable embodiments, the cover or a portion of the cover, for example the back panel and/or the side panels, is formed from or includes a fabric that has antibacterial properties. For example, the fabric could be treated with silver or an antibacterial coating to impart antibacterial and/or antimicrobial properties to the fabric and, thus, the cover. Alternatively, the cover can be formed from a fabric that inherently possesses antibacterial and/or antibacterial properties. Suggested fabrics that inherently possess antibacterial and/or antibacterial properties include, but are not limited to, bamboo fabrics. It is believed that bamboo fabrics have the ability to reduce harmful microbes that cause odor and can lead to infection. Advantageously, bamboo fabrics are also all natural and hypoallergenic. Furthermore, because bamboo is a natural cellulose fiber, it is biodegradable and thus is environmentally sensitive and sustainable. Finally, bamboo is soft and believed to be cooler to the touch in hot weather than regular fabrics. In certain desirable embodiments, the cover or at least portions of the cover is formed from a fabric that is fire retardant or treated with a fire retardant.

In certain embodiments, the cover is formed from an unpadded, single layer of fabric so that the cover can be cleaned and dried quickly using a conventional washers and/or dryers and convention laundering methods. In certain other embodiments, the cover or a majority of the cover is made from a disposable or semi-disposable fabric so that the car seat cover can be used one or more times and then discarded and replaced with a new car seat cover. As used herein with reference to a cover "semi-disposable" means that the car seat cover is used and after the cover has been soiled, the cover can be laundered and reused at least once and more preferably at least a few times before it is discarded. Suggested examples of disposable fabrics and semi-disposable fabrics include, but are not limited to, nonwoven fabrics such as spunbown/meltblown/spunbond (SMS) laminates, hydroknit fabrics and laminates of hydroknit fabrics for example a spunbown/meltblown/spunbond laminate and a hydroknit fabric. Advantageously, these nonwoven fabrics may be able to be joined by ultrasonic welding or heat sealing rather than sewing. In certain embodiments, the cover or a portion of the cover, for example back panel and/or the side panels, is formed from or include a water-resistant or water-repellant coating, a layer water-resistant or water-repellant or a water-resistant or water-repellant fabric so that a spilled drink, urine and other liquids do not penetrate the car safety seat cover and wet the car safety seat below making clean up easier. The cover can be formed from a single layer fabric, a multilayer fabric, or a laminate.

Seat covers according to the invention are not limited in their application to child car seats as illustrated and described above. It should be understood that these covers may be usable on any other type of child seat that has a releasable safety harness, such as swing seats, high chair seats, stroller seats, and infant carriers. For example, a cover of the present invention may also optionally be used an aftermarket seat cover for a baby or infant stroller.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

I claim:

1. A cover for a car safety seat, the car safety seat having a seat bottom and including at least a pair of shoulder straps and a crotch belt and buckle assembly for releasably coupling to the shoulder straps,
the cover comprising at least one panel, the at least one panel including a crotch opening though which a crotch belt and buckle assembly is designed to pass and a tubular extension having a first end attached around the crotch opening and a second end that is open and through which the buckle assembly of the crotch belt and buckle assembly is designed to pass; and
wherein the second end of the tubular extension further comprises a means for gathering the second end of the tubular extension around a crotch belt.

2. The cover of claim 1, wherein the means for gathering the tubular extension around a crotch belt is an elastic or an elasticized portion that is designed and adapted to gather the second end of the tubular extension around a crotch belt below a buckle assembly.

3. The cover of claim 1, wherein the first end of the tubular extension has a first end width (WFE) and the second end of the tubular extension has a second end width (WSE), wherein the first end width (WFE) is greater than the second end width (WSE).

4. The cover of claim 3, wherein the second end of the tubular extension further comprises an elasticized portion that is designed and adapted to gather the second end of the tubular extension around a crotch belt below a buckle assembly.

5. The cover of claim 1, wherein the first end of the tubular extension has a first end width (WFE) and the second end of the tubular extension has a second end width (WSE), wherein the first end width (WFE) is greater than about twice the second end width (WSE).

6. The cover of claim 5, wherein the second end of the tubular extension further comprises an elasticized portion that is designed and adapted to gather the second end of the tubular extension around a crotch belt below a buckle assembly.

7. A cover for a car safety seat, the car safety seat having a seat bottom and including at least a pair of shoulder straps and a crotch belt and buckle assembly for releasably coupling to the shoulder straps,
the cover comprising at least one panel, the at least one panel including a crotch opening though which a crotch belt and buckle assembly is designed to pass and a tubular extension having a first end attached around the crotch opening and a second end that is open and through which the buckle assembly of the crotch belt and buckle assembly is designed to pass; and
further comprising a left lap belt extension that comprises an extension having a first end attached at a left lap belt opening and a second end that is open and through which a left lap belt is designed and adapted to pass and a right lap belt extension that comprises an extension having a first end attached at a right lap belt opening and a second end that is open and through which a right lap belt is designed and adapted to pass; and
wherein the left lap belt extension comprises mating separable fastening elements designed and adapted to releasably close the left lap belt extension around a left lap belt and the right lap belt extension comprises mating separable fastening elements designed and adapted to releasably close the right lap belt extension around a right lap belt.

8. The cover of claim 7, wherein the left lap belt extension further comprises an elasticized portion that is designed and adapted to gather around a left lap belt and the right lap belt extension further comprises an elasticized portion that is designed and adapted to gather around a right lap belt.

9. A cover for a car safety seat, the cover comprising:
a back panel having an upper portion and a lower portion and a left side and a right side; a right side panel joined to the lower portion and the upper portion of the right side of the back panel;
a left side panel joined to the lower portion and the upper portion of the left side of the back panel;
a right, substantially vertical slit;
a left, substantially vertical slit;
a right substantially horizontal slit that extends to right vertical slit and that is designed and adapted to allow a right shoulder belt to pass through;
a left substantially horizontal slits that extends to left vertical slit and that is designed and adapted to allow a left shoulder belt to pass through; and
a perimeter band that encircles the outer edges of the back panel, left side panel and right side panel;
and further comprising an opening for a crotch belt and a tubular extension having a first end that is attached to the lower portion of the back panel and is disposed around the opening for a crotch belt and a second end that includes a means for gathering the tubular extension around a crotch belt.

10. The cover of claim 9 wherein the means for gathering comprises a tie, a ribbon, a string, an elastic or mating separable fasteners.

11. A cover for a car safety seat the cover comprising:
a back panel having an upper portion and a lower portion and a left side and a right side;
a right side panel joined to the lower portion and the upper portion of the right side of the back panel;
a left side panel joined to the lower portion and the upper portion of the left side of the back panel;
a right, substantially vertical slit;
a left, substantially vertical slit;
a right substantially horizontal slit that extends to right vertical slit and that is designed and adapted to allow a right shoulder belt to pass through;
a left substantially horizontal slits that extends to left vertical slit and that is designed and adapted to allow a left shoulder belt to pass through; and
a perimeter band that encircles the outer edges of the back panel, left side panel and right side panel;
and further comprising a tubular extension attached at one end to an opening in a lower portion of the back panel; and
wherein the tubular extension comprises a means for gathering the tubular extension around a crotch belt.

* * * * *